(12) United States Patent
Dawson et al.

(10) Patent No.: US 8,145,725 B2
(45) Date of Patent: *Mar. 27, 2012

(54) UPDATING DATA STORES OF VIRTUAL WORLDS BASED ON DATA STORES EXTERNAL TO THE VIRTUAL WORLDS

(75) Inventors: Christopher J. Dawson, Arlington, VA (US); Rick A. Hamilton, II, Charlottesville, VA (US); Michael D. Kendzierski, New York, NY (US); Susan K. Schreitmueller, Elon, NC (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 286 days.

This patent is subject to a terminal disclaimer.

(21) Appl. No.: 11/930,940

(22) Filed: Oct. 31, 2007

(65) Prior Publication Data

US 2009/0112970 A1    Apr. 30, 2009

(51) Int. Cl.
 *G06F 15/16* (2006.01)
(52) U.S. Cl. ........................................... 709/217
(58) Field of Classification Search .......... 709/217–219, 709/248
See application file for complete search history.

(56) References Cited

U.S. PATENT DOCUMENTS

| | | | |
|---|---|---|---|
| 5,956,038 A * | 9/1999 | Rekimoto | 345/419 |
| 6,037,950 A | 3/2000 | Meir et al. | |
| 6,256,043 B1 | 7/2001 | Aho et al. | |
| 6,298,374 B1 | 10/2001 | Sasaki et al. | |
| 6,349,301 B1 * | 2/2002 | Mitchell et al. | 707/101 |
| 6,519,571 B1 | 2/2003 | Guheen et al. | |
| 6,793,580 B2 * | 9/2004 | Sinclair et al. | 463/39 |
| 6,871,186 B1 | 3/2005 | Tuzhilin et al. | |
| 7,115,034 B2 | 10/2006 | Kuwahara | |
| 7,139,984 B2 | 11/2006 | Beaumont et al. | |
| 7,225,256 B2 | 5/2007 | Villavicencio | |
| 7,346,705 B2 * | 3/2008 | Hullot et al. | 709/238 |
| 2003/0119531 A1 | 6/2003 | Patton et al. | |
| 2005/0108363 A1 * | 5/2005 | Torigoe et al. | 709/218 |
| 2006/0136395 A1 | 6/2006 | Rhee et al. | |
| 2006/0210045 A1 | 9/2006 | Valliath et al. | |
| 2006/0235791 A1 | 10/2006 | Jung et al. | |
| 2007/0063999 A1 | 3/2007 | Park | |

(Continued)

OTHER PUBLICATIONS

Non-final office action dated Sep. 15, 2010 for U.S. Appl. No. 11/928,852. Non-final office action dated Aug. 17, 2010 for U.S. Appl. No. 11/928,771.
Final office action dated Dec. 6, 2010 for U.S. Appl. No. 11/928,771.

*Primary Examiner* — Joseph Avellino
*Assistant Examiner* — Jeong S Park
(74) *Attorney, Agent, or Firm* — Schubert Law Group (57) ABSTRACT

In a method of updating virtual worlds, a specification of a data store of a user is received from the user. The data store is external to the virtual world. Data from the data store of the user is automatically gathered in response to receiving the specification. A representation of the data is generated. The representation of the data is transmitted to the virtual world. A data store of the virtual world is updated based on the representation of the data. The data store of the virtual world is displayed in a personal area of the user in the virtual world responsive to updating the data store. An icon representing the data store of the virtual world is displayed in the personal area of the user. The data store of the virtual world is kept private to the user.

20 Claims, 5 Drawing Sheets

U.S. PATENT DOCUMENTS

| | | |
|---|---|---|
| 2007/0118420 A1 | 5/2007 | Jung et al. |
| 2007/0130001 A1 | 6/2007 | Jung et al. |
| 2008/0104495 A1 | 5/2008 | Craig |
| 2008/0263446 A1 | 10/2008 | Altberg et al. |
| 2008/0263459 A1 | 10/2008 | Altberg et al. |
| 2008/0263460 A1 | 10/2008 | Altberg et al. |
| 2009/0113314 A1 | 4/2009 | Dawson et al. |
| 2009/0113319 A1* | 4/2009 | Dawson et al. ............... 715/762 |
| 2009/0138335 A1 | 5/2009 | Lieberman |

* cited by examiner

UPDATING DATA STORES OF VIRTUAL WORLDS BASED ON DATA STORES EXTERNAL TO THE VIRTUAL WORLDS

FIELD

The present invention is in the field of virtual worlds. More particularly, the present invention relates to methods and arrangements to automatically update a virtual world.

BACKGROUND

A virtual world is a computer-based simulated environment. The environment may resemble the real world, with real world rules such as gravity, topography, and locomotion; and with social and economic interactions between characters. Users may be represented as avatars, two or three-dimensional graphical representations. Many virtual worlds allow for multiple users and provide for communications between the users. Virtual worlds may be used for massively multiple online role-playing games, for social or business networking, or for participation in imaginary social universes.

A participant in a virtual world may have information obtained from outside the virtual world environment that would be useful in the environment. The user may, for example, hold contact information in Outlook Express that could be useful for contacting a friend from inside the virtual world. Similarly, a participant in a social networking virtual world may have links or RSS feeds available on a web browser but outside the virtual world environment. Without any automatic translation and synchronization between the non-virtual world and virtual world, either data will not be available or a user would have to constantly move in and out of the virtual world to duplicate the information inside the virtual world. For example, a Second Life participant may enter contact information about another Second Life participant into an Outlook Express address book. The contact information may include telephone numbers, address and a Second Life avatar name. The participant may then enter the Second Life virtual world to interact with other virtual world avatars. In the current art, to communicate with the other participant, the participant may have to enter Outlook Express to view the address book. Accessing the address book may require logging out of the virtual world, using a different computer, or using a different screen. The participant may then write down the avatar name for the new contact, and re-enter the virtual world before virtual world collaboration can take place. Under current methods, a user confronts the problem of having to constantly move between the virtual and non-virtual world to update the virtual world.

SUMMARY

In at least one embodiment, there is a method of updating virtual worlds. The method includes receiving from a user a specification of a data store of the user. The data store is external to a virtual world. The receiving includes receiving a specification of one or more of the following types of data stores: bookmarked web sites; recently visited web sites; RSS feeds; blogs; social networking sites; integrated e-mail alerts; calendar entries; encrypted vaults for passwords; cookies; form-fill information; documents; spreadsheets; data bases; music files; videos; pictures; and other media files. The method further includes automatically gathering data from the data store of the user, responsive to the receiving of the specification of the data store of the user. The method further includes generating a representation of the data. The method further includes transmitting the representation of the data to the virtual world. The method further includes updating a data store of the virtual world, based upon the representation of the data. The method further includes displaying the data store of the virtual world in a personal area of the user in the virtual world, the displaying responsive to the updating. The data store of the user and the data store of the virtual world include data stores of the one or more types of data stores. The data store of the virtual world includes an object of the virtual world. The displaying the data store of the virtual world in the personal area of the user includes displaying an icon representing the data store of the virtual world in the personal area of the user and keeping the data store of the virtual world private to the user.

In at least one other embodiment, there is a computer system to update virtual worlds. The computer system includes a processor, a computer readable memory, and a computer readable tangible storage device. The computer system further includes first program instructions to receive from a user a specification of a data store of the user. The data store is external to a virtual world. The first program instructions include program instructions to receive a specification of one or more of the following types of data stores: bookmarked web sites; recently visited web sites; RSS feeds; blogs; social networking sites; integrated e-mail alerts; calendar entries; encrypted vaults for passwords; cookies; form-fill information; documents; spreadsheets; data bases; music files; videos; pictures; and other media files. The computer system further includes second program instructions to automatically gather data from the data store of the user based upon the specification of the data store of the user. The computer system further includes third program instructions to generate a representation of the data. The computer system further includes fourth program instructions to transmit the representation of the data to the virtual world. The computer system further includes fifth program instructions to update a data store of the virtual world based upon the representation of the data. The computer system further includes sixth program instructions to display the data store of the virtual world in a personal area of the user in the virtual world in response to updating the data store of the virtual world based upon the representation of the data. The data store of the user and the data store of the virtual world include data stores of the one or more types of data stores. The data store of the virtual world includes an object of the virtual world. The sixth program instructions comprise program instructions to display an icon representing the data store of the virtual world in the personal area of the user and program instructions to keep the data store of the virtual world private to the user. The first, second, third, fourth, fifth, and sixth program instructions are stored on the computer readable tangible storage device for execution by the processor via the computer readable memory.

In at least one other embodiment, there is a computer program product to update virtual worlds. The computer program product includes a computer readable tangible storage device. The computer program product further includes first program instructions to receive from a user a specification of a data store of the user. The data store is external to a virtual world. The first program instructions comprise program instructions to receive a specification of one or more of the following types of data stores: bookmarked web sites; recently visited web sites; RSS feeds; blogs; social networking sites; integrated e-mail alerts; calendar entries; encrypted vaults for passwords; cookies; form-fill information; documents; spreadsheets; data bases; music files; videos; pictures; and other media files. The computer program product further includes second program instructions to automatically gather data from the data store of the user. The computer program product further includes third program instructions to generate a representation of the data. The computer program product further includes fourth program instructions to transmit the representation of the data to the virtual world. The computer program product further includes fifth program instructions to update a data store of the virtual world based upon the representation of the data. The computer program product further includes sixth program instructions to display the data store of the virtual world in a personal area of the user in the virtual world in response to updating the data store of the virtual world based upon the representation of the data. The data store of the user and the data store of the virtual world include data stores of the one or more types of data stores. The data store of the virtual world includes an object of the virtual world. The sixth program instructions comprise program instructions to display an icon representing the data store of the virtual world in the personal area of the user and program instructions to keep the data store of the virtual world private to the user. The first, second, third, fourth, fifth, and sixth program instructions are stored on the computer readable tangible storage device.

BRIEF DESCRIPTION OF THE DRAWINGS

Advantages of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements of automatically updating virtual worlds are contemplated. Embodiments include transformations, code, state machines or other logic to receive from a user a specification of a data store of the user external to a virtual world. The method may involve automatically gathering data from the data store of the user, responsive to the receiving; generating a representation of the data, and transmitting the representation of the data. In many embodiments, the representation may contain a designation of a data store of the virtual world to be updated by the representation. In some embodiments, a display of the user in the virtual world may be based upon the data store of the virtual world.

While specific embodiments will be described below with reference to particular circuit or logic configurations, those of skill in the art will realize that embodiments of the present invention may advantageously be implemented with other substantially equivalent configurations.

Figure 1:
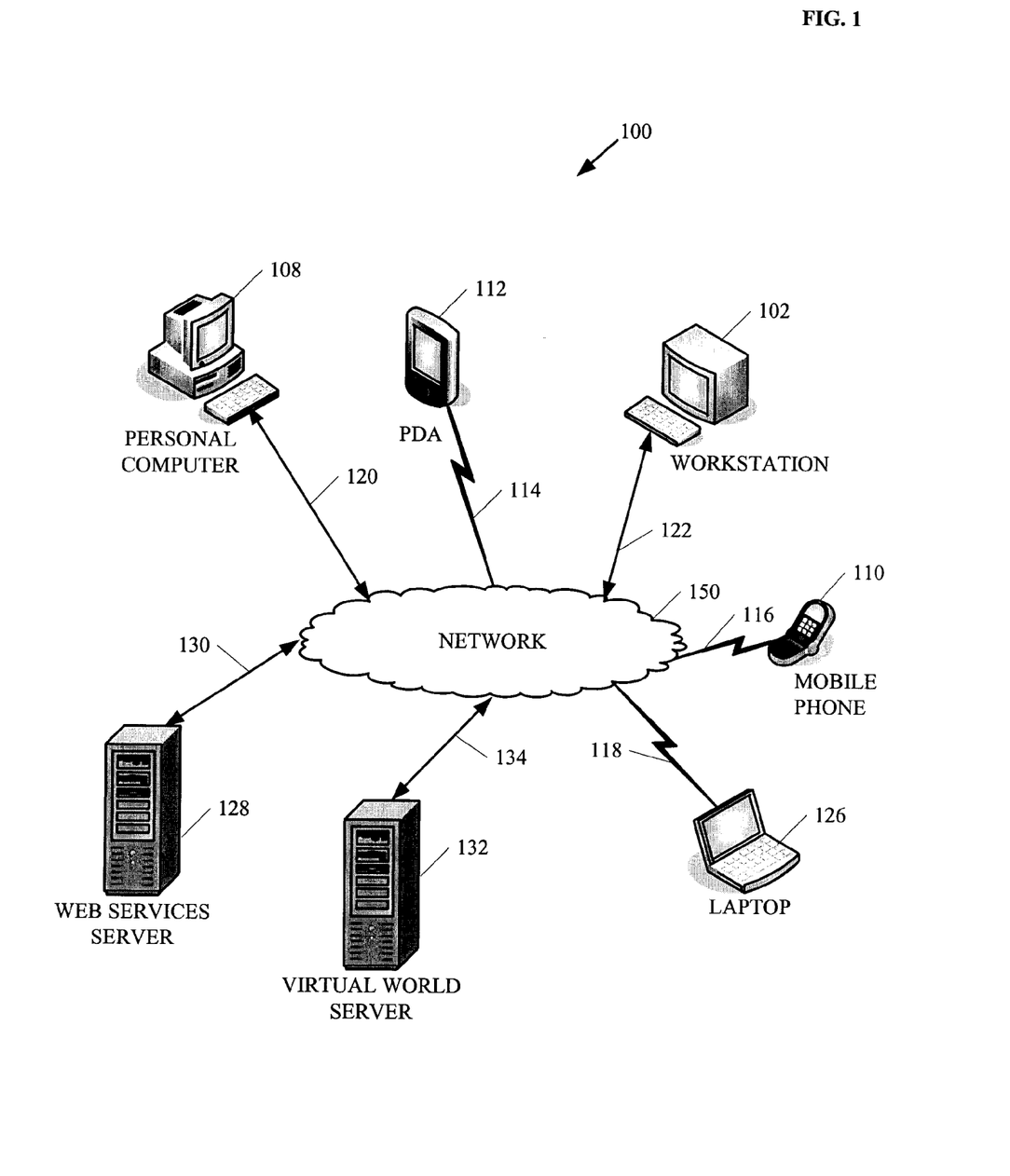
FIG. 1 sets forth an embodiment of a networked system of devices capable of automatically updating virtual worlds.

FIG. 1 depicts a diagram of an embodiment of a networked system 100 of devices capable of automatically updating virtual worlds. The system 100 includes a network 150, web services server 128 connected to network 150 through wireline connection 130, virtual world server 132 connected to network 150 through wireline connection 134, and a variety of devices capable of automatically updating a virtual world (local computers), including:

workstation 102, a computer coupled to network 150 through wireline connection 122,     personal digital assistant 112, coupled to network 150 through wireless connection 114,     personal computer 108, coupled to network 150 through wireline connection 120,     laptop computer 126, coupled to network 150 through wireless connection 118; and     mobile phone 110, coupled to network 150 through wireless connection 116.

The devices 102, 108, 110, 112, and 126 may receive from a user a specification of a data store of the user, automatically gather data from the data store of the user; and transmit a representation of the data for display by virtual world server 132 to the user in a virtual world. The representation of data may contain a designation of a data store of the virtual world to be updated by the transmitted data.

Network 150, which may consist of the Internet or another wide area network, a local area network, or a combination of networks, may provide data communications among web services server 128, virtual world server 132, and the devices 102, 108, 112, 126, and 110.

Web services server 128 may have installed and operative upon it software to perform web services. Web services present a standardized way of integrating web-based applications. Web services typically provide business services upon request through data communications in standardized formats called bindings. A binding is a specification of a data encoding method and a data communications protocol. The most common binding in use for web services is data encoding in XML according to the SOAP protocol and data communications with HTTP. SOAP (Simple Object Access Protocol) is a request/response messaging protocol that supports passing structured and typed data using XML and extensions.

Web services are often delivered by use of multi-node transactions carried out through the use of web services intermediaries. Web services intermediaries are web services components, typically a server, that lie between a web services requester and a web services ultimate destination server that delivers the web service. Intermediaries operate generally by intercepting a request from a client, optionally providing intermediary services, and then forwarding the request to an ultimate destination web services provider.

Web services server 128 may receive from one of the devices 102, 108, 110, 112, and 126 a request to update a user's personal space in the virtual world maintained by virtual world server 132. The request may contain a specification of a data source of the virtual world to be updated, a list of the updates to be made, and security information for the user, such as a login and password. Web services server 128 may process the request, producing a list of updates in a format understandable by virtual world server 132, and may forward the results to virtual world server 132.

Virtual world server 132 may have installed and operative upon it software to implement a virtual world. A virtual world is a computer-based simulated environment. The environment may resemble the real world, with real world rules such as gravity, topography, and locomotion. Users may be represented by two or three-dimensional graphical representations called avatars. Many, but not all, virtual worlds allow for multiple users. Avatars may communicate by text or by real-time voice communication using VOIP. Virtual world are often used in massively multiplayer online role-playing games such as EverQuest, Ultima Online, Lineage, World of Warcraft, or Guild Wars. Other virtual worlds provide for simulated economic and social interaction in environments where the focus is more on the participation and less on winning and losing. These virtual worlds include Active Worlds, There, Second Life, Entropia Universe, The Sims Online, Kaneva, and Weblo. Still other virtual worlds may provide a social networking experience. A user may enter some virtual worlds to share favorite blogs or other web sites with other participants.

Virtual world server 132 may maintain home areas or personal areas for users. A user may be required to log in and provide a password or otherwise undergo security checking to gain access to the user's home area. A user's home area may contain information under the control of a user. In some embodiments of virtual worlds, the information may be private to the user. Home areas may include data stores for display by users, such as address books, favorites, RSS feeds, and blogs. Virtual world server 132 may receive from web services server 128 a list of updates to information maintained in home areas or other areas for users. The updates may specify the user names, data stores containing the information, and login information. Virtual world server 132 may verify the login information and update the data stores with the personal information provided from the web services server 128. When a user logs in and views the virtual world, virtual world server 132 may display the updated information. In many embodiments, the updated information may be included in a display of the user's home area.

The arrangement of web services server 128, virtual world server 132 and other devices making up the exemplary system 100 illustrated in FIG. 1 is for explanation, not for limitation. Data processing systems useful according to various embodiments of the present invention may omit a server, or may include additional servers, routers, other devices, and peer-to-peer architectures, not shown in FIG. 1, as will occur to those of skill in the art. In some embodiments, a computing device such as one of devices 102, 108, 112, 126, and 110 may transmit updates directly to a virtual world server device, without using a web service such as web service server 128 as an intermediary. In some other embodiments, there may be multiple web services intermediary between a user's computing device and a virtual world. In many other embodiments, programs other than web services may act as an intermediary.

Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
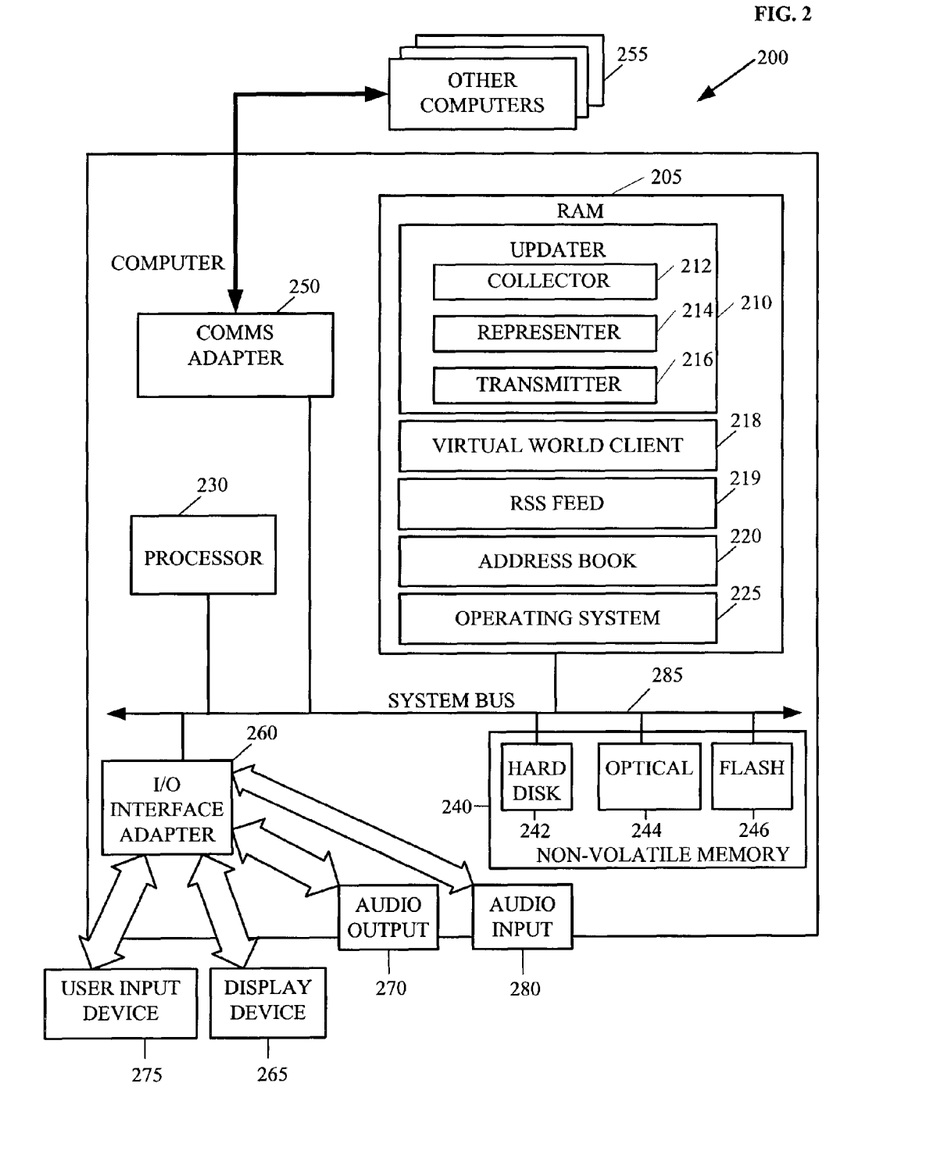
FIG. 2 depicts an embodiment of a computer capable of automatically updating a virtual world.

Turning to FIG. 2, depicted is an embodiment of a computer 200 capable of automatically updating a virtual world that includes random access memory (RAM) 205, a processor 230 or CPU, non-volatile memory 240, a communications adapter 250, and an Input/Output (I/O) interface adapter 260 connected by system bus 285. Stored in RAM 205 is updater 210, virtual world client 218, RSS feed 219, address book 220, and an operating system 225.

Updater 210 may comprise computer program instructions for automatically updating virtual worlds. Updater 210 includes collector 212, representer 214, and transmitter 216. Collector 212 may receive from a user a specification of one or more data stores of the user. A data store is a source of the user's data, such as RSS feed 219 or address book 220. In the embodiment of FIG. 2, the data stores such as RSS feed 219 and address book 200 are separate from, or external to, the virtual world. The data stores may be maintained by a program other than virtual world programs, such as an email program or a web browser. Collector 212 may also automatically gather data from the data store of the user. The data may consist of changes to the data store to be replicated in a virtual world.

Representer 214 may create a representation of the data for updating the virtual world. The representation may include the data and a designation of a data store of the virtual world to be updated by the transmitted data. For example, information in an address book such as address book 220 may be used to update an address book in the virtual world. The representation may also include security information for accessing the virtual world, such as the user's login and password. The representation may be in the form of an XML document, straight text, or another form of representation. In an XML document, the data may be tagged. The tags may designate a data store of the virtual world to be updated with the information, the user whose virtual world data is to be updated, or even the field of data to be updated. For example, the use of an XML representation may allow a representation of a change in an email address by a specification of the name of the addressee and the new email address, without the need for specification of other fields of the email address.

Transmitter 216 may transmit the representation. The transmission may be sent directly to the virtual world, or may be sent to an intermediary, such as a web service, for further processing. Virtual world client 218 may comprise computer program instructions for interacting with a virtual world. Virtual world client 218 may transmit user input to the virtual world, and may process transmissions from the virtual world for output on a device such as display device 265 or audio output 270.

RSS feed 219 may comprise computer program instructions for an RSS feed. RSS is a family of web feed formats used to publish frequently updated content such as blog entries, news headlines, or pod casts. An RSS document may contain either a summary of the content or the full text. RSS feeds provide an automated mechanism for keeping current with web site contents. RSS content may be read using feed reader software. A user may subscribe to a feed. The feed reader may regularly check the feed for new content, and download the updates.

Operating system 225 may comprise UNIX™, Linux™, Microsoft Windows™, AIX™, IBM's i5/OS™, or other operating systems useful for automatically updating virtual worlds as will occur to those of skill in the art. Updater 210, virtual world client 218, RSS feed 219, address book 220, and operating system 225 (components of software) are shown in RAM 205 in FIG. 2, but many components of such software may be stored in non-volatile memory 240 also. Further, while the components of such are shown simultaneously present in RAM, in some other embodiments, only some of the components of RAM 205 may be present at any given time.

The modules shown in RAM 205 are for explanation, not for limitation. In many other embodiments, updater 210 may constitute a component of virtual world client 218. In some embodiments, a virtual world client may be omitted. For example, a user may interact with a virtual world through a web browser. Data stores may include alternative or additional data stores, including but not limited to:

- Bookmarked web sites
- Web history
- Blogs
- Social Networking sites
- Integrated e-mail (Yahoo, Gmail, Hotmail) alert
- Calendar entries
- Encrypted Vaults for passwords
- Cookies and form-fill information
- Documents, spreadsheets, and other data collections
- Music, video, and other media files An encrypted vault may store a group of passwords in encrypted form and allow access to all at once. For example, a user may use a password to access passwords stored in the vault.

Non-volatile computer memory 240 may be implemented as a hard disk drive 242, optical disk drive 244, electrically erasable programmable read-only memory space (EEPROM or Flash memory) 246, RAM drives (not shown), or as any other kind of computer memory as will occur to those of skill in the art. Communications adapter 250 may implement the hardware level of data communications between computer 200 and other computers, such as other computers 255. The data communications may occur directly or through a network and may include communicating with a virtual world server or web service server. Such data communications may be carried out serially through RS-232 connections, through external buses such as USB, through data communications networks such as IP networks, and in other ways as will occur to those of skill in the art. Examples of communications adapters include modems for wired dial-up communications, Ethernet (IEEE 802.3) adapters for wired network communications, and 802.11 abgn adapters for wireless network communications.

I/O interface adapter 260 implements user-oriented I/O through, for example, software drivers and computer hardware for controlling output to display devices such as display device 265 and audio output device 270 as well as user input from user input device 275 and audio input device 280. User input device 275 may include both a keyboard and a mouse. Some embodiments may include other user input devices such as speech interpreters, bar code scanners, text scanners, tablets, touch screens, and/or other forms of user input devices. Audio output 270 may include speakers or headphones and audio input device 280 may include a microphone or other device to capture sound.

The computer and components illustrated in FIG. 2 are for explanation, not for limitation. In other embodiments, embedded systems, PDAs, cell phones, BlackBerries® and other computing devices which contain a user's data stores and which can connect to a network may automatically update a virtual world. In other embodiments, modules to automatically update virtual worlds may be implemented in hardware, firmware, or in state machines or may form a component of an operating system.

Figure 3A:
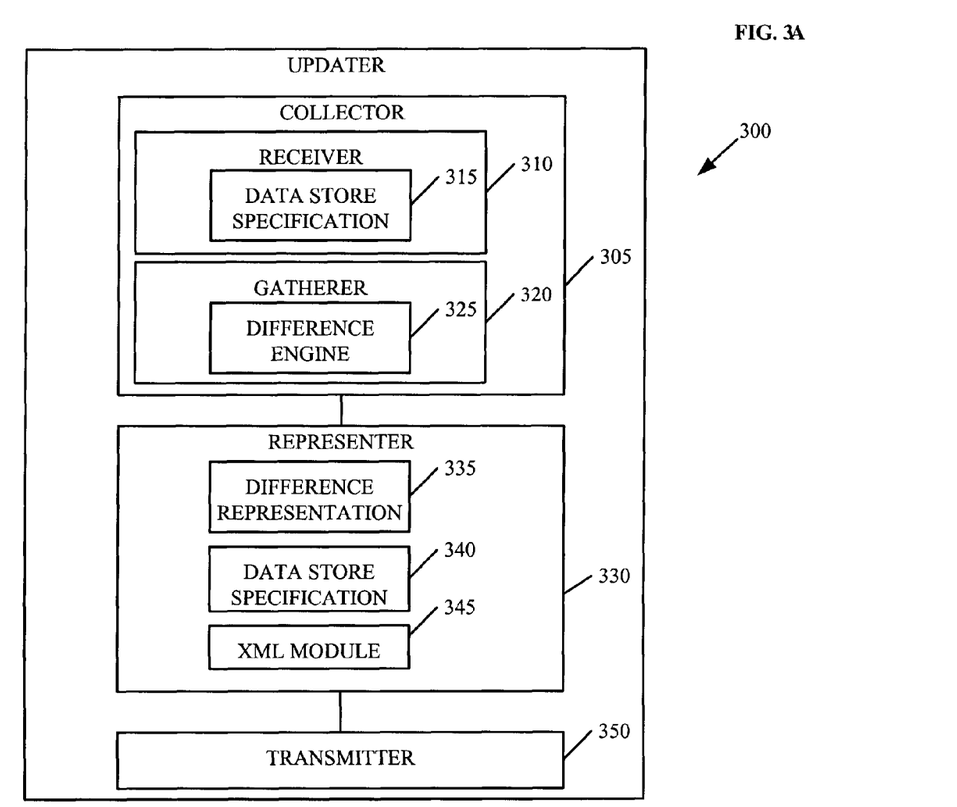
FIG. 3A depicts an embodiment of an apparatus for automatically updating a virtual world.

For further explanation, FIG. 3A sets forth a block diagram illustrating an exemplary apparatus 300 for automatically updating a virtual world. Updater 300 includes collector 305, representer 330, and transmitter 350. Collector 305 includes receiver 310 and gatherer 320. Receiver 310 may receive from a user a specification of a data store of the user external to the virtual world. In some embodiments, the data store may be contained on the user's local computer system. In other embodiments, the data store may be accessible over a network. Receiver 310 may store the specification of the data store in data store specification 315. Gatherer 320 gathers data from the data store specified in data store specification 315. In the embodiment of FIG. 3A, gatherer 320 includes difference engine 325. Difference engine 325 may detect changes in the data store since its previous execution. On the initial specification of a data store, gatherer 320 may create a base line describing the data in the specified data store. Difference engine 325 may treat the entire data store as a change, since there was no previous baseline. On subsequent operations, difference engine 325 may determine the difference between the current base line and the current data in the data store and may update the base line for the data store to the current data. In some embodiments, the gatherer 320 may selectively check for updates to data in the data store. For example, a gatherer 320 may update a virtual world address book with a new address from an email program only if the "other" field of the new address contains the tag "VW".

Gatherer 320 may comprise a set of daemons or software agents installed on non-virtual world systems. In some embodiments, a software agent may run on a user's local computer system and may check for updates to information that is stored on the local computer system. The software agent may include a menu to allow the user to specify data stores to be checked for updates. The software agent may be synchronous, for example running at certain intervals, or may be event driven. In an event driven mode, software that houses the data store may have a hook or plug in into the software agent to initiate the transfer of data to the virtual world. The software agent may be registered as a handler of the event. When an event in the data store occurs, such as adding information to the data store, the software housing the data store may pass control to the software agent. It may check for updates and may return control to the data store.

Representer 330 creates a representation of the data in the specified data store for transmission to the virtual world. Representer 330 may run on the client side, perhaps on a user's computer system, or as a shared service provided by the virtual world provider. Representer 330 includes difference representation module 335, data store specification 340, and XML module 345. Difference representation module 335 may generate a representation of the difference between the current data in the specified data store and the base line data for the data store. The representation may, for example, include a list of additions and a list of deletions. Data store specification 340 may generate a specification of a data store of a virtual world to be updated with the data gathered by gatherer 320. For example, an address book of the user in a virtual world may be updated by new addresses gathered from an address book of the user on his local computer. Similarly, a list of bookmarks stored in the virtual world may be updated by changes to a user's Internet bookmarks on his local computer. As another example, a virtual world data store containing RSS feeds may be updated by changes to a local RSS feed.

XML module 345 may create an XML document embodying the representation of the data. The XML document may, for example, contain tags to describe the data used to update a virtual world. The tags may include a specification of the data store of the virtual world to be updated and the identification of the user. In some embodiments, the tags may specify the field of data to be updated. For example, the email address of a contact may be changed, while the name, address, and phone number remain unchanged. In this case, the XML representation of the change may describe the contact and the new email address, but would not describe the unchanged phone number. The XML document may contain other information, such as security information. For example, the XML document may contain the user's login and password for the virtual world.

In some embodiments, representer 330 may represent the updates in the format used by the virtual world being updated. This representation may involve a reformatting of the information gathered from the user's data stores. For instance, representer 330 may change an email address from a format used in Outlook to a format used in the virtual world. In other embodiments, the representation may preserve the initial format, and a translation may occur elsewhere. In further embodiments, a web service may translate between a data format used in a user's data store and a data format used in a virtual world. In still other embodiments, the virtual world itself may perform the translation. A format translator may include multiple methods to translate non-virtual world information. Each data store within the virtual world that is able to be modified by this method must be exposed to the format translator—perhaps as a list of objects and the properties of each. The user may then map the non-virtual world data items to the virtual world objects to set up a relationship. Each relationship may be updated through a scheduled, batch or event driven process.

Transmitter 350 transmits the representation of the data for updating the virtual world. The destination of the representation may be the virtual world or an intermediate address, such as a web service that provides intermediate processing before forwarding the data to the virtual world. Once this information is collected either in real-time or in batch mode (for example, every 12 or 24 hours), this information would be sent to the virtual user's "personal area," an area accessible by the user. Any information that was updated in the non-virtual world space would be populated in the virtual world via this method.

The modules of FIG. 3A are for illustration and not limitation. An apparatus for automatically updating a virtual world in accordance with embodiments of the invention may omit some of the modules shown, may include additional modules, or may contain different arrangements of modules. A gatherer may, for example, omit a difference engine. In some embodiments, for example, it may detect a change in data by, for example, examining the date of the data in the data store. The gatherer may then collect the entire data of the data store for transmission to the virtual world. The virtual world may completely replace the data in a data store with the transmitted data. In these embodiments, a representer may also omit a difference representation module. In other embodiments, the data store may itself record changes. In these embodiments, a difference engine to create a baseline and check for changes may, therefore, prove unnecessary. The gatherer may gather the changes recorded by the data store rather than determining for itself the differences between the current state of the data store and a previous state. In many embodiments, data may be gathered from multiple data stores for updating multiple data stores in a virtual world.

A representer may create a representation in formats other than XML. The formats may include extensions of XML, such as XBase, XLink, XInclude, XSL (Extensible Stylesheet Language), XSLT (Extensible Stylesheet Language Transformations), XPointer, XML Query, and SOAP (Simple Object Access Protocol). The formats may also include non-XML formats, such as straight text.

Figure 3B:
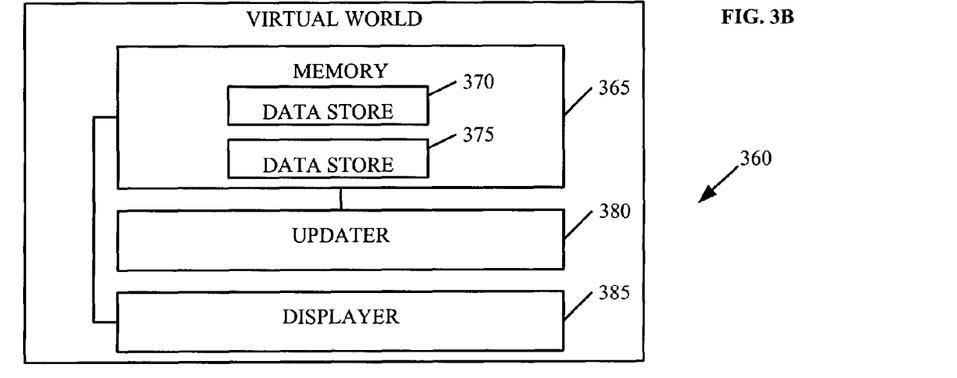
FIG. 3B depicts a virtual world capable of being automatically updated.

Turning to FIG. 3B, depicted is a block diagram illustrating a virtual world 360 capable of being automatically updated. Virtual world 360 includes memory 365, updater 380, and displayer 385. Memory 365 may include data stores 370 and 375. Data stores 370 and 375 may hold data in the personal area of a user that is automatically updated by an apparatus such as updater 300 of FIG. 3A. For example, a data store may hold addresses of a user's contacts in a virtual world or favorite web sites for viewing from the virtual world.

Updater 380 may receive a representation of changes to be made to a data store from an apparatus such as updater 300 of FIG. 3A. The representation may include a list of changes and a specification of a data store. Updater 380 may make the changes to the data in the designated data store. In some embodiments, updater 380 may check security information, such as login and password, before updating information.

Displayer 385 may comprise a virtual world rendering engine and object storage system. Displayer 385 may display the data from an updated data store, such as data store 370 or data store 375, in the format of the virtual world. For example, favorite web sites may be displayed as notes on a wall, or as books on a library shelf. An RSS feed may be displayed as an icon which, when touched, displays the contents of RSS feeds. The display may be a display of the user in the virtual world, the display that the virtual world may tailor to a particular user when the user signs in. The display may include the user's avatar, the avatar's equipment and surroundings, and the home or personal area of the user. The display may involve a series of choices. For example, to display a new Internet bookmark, displayer 385 may examine the current list of bookmarks projected onto the wall of the virtual office to determine whether there is space to add another bookmark. Similarly, displayer 385 may determine a new order or a new color for the bookmarks. In some embodiments, displayer 385 may update the virtual world display periodically, on refresh cycles. In many embodiments, displayer 385 may make display changes whenever data stores are updated. In several embodiments, updates from multiple users may be batched together. In a few embodiments, updates to multiple instances of the same virtual world object, such as an RSS feed object, may be batched. In a few embodiments, displayer 385 may determine whether or not to display a change. For example, there may be insufficient space to display an additional bookmark.

FIG. 3B is for illustration and not for limitation. Other embodiments of a virtual world capable of being automatically updated may contain other modules or other arrangements of modules. In some embodiments, the displayer may also maintain the data stores. In further embodiments, the virtual world may provide a service to receive the representations of data updates from an updater such as updater 300 of FIG. 3A. The service may determine which objects in the virtual world should be changed. It may scan through each piece of new information, determine an object or objects whose display may be affected as a result of the update, and determine the attributes of the objects to be altered. In order to communicate with the virtual world to instantiate these changes, an application programming interface (API) or other communication method may be exposed by the provider of the virtual world. This API may be called by the updater to have the changes made. An API may consist of a set of routines made available to application programmers by an application such as a virtual world. The programmer may access information from the application or request the performance of low-level tasks by the application by calling upon the routines of the API.

Some embodiments of FIGS. 3A and 3B may create linkages between a user's environment and a virtual world environment, to build a better and content-rich virtual environment. By automating the updates of information between the virtual world and non-virtual world, information from a non-virtual world may be integrated with the virtual world and the user's experience may be improved. For example, a user could bookmark a blog or RSS feed using a standard web browser. The next time the user accessed the virtual world, any relevant information contained in the blog or RSS feed may have automatically been transferred to the virtual world or otherwise made available to the virtual world. If a user receives an RSS update, the user could view the update in the virtual world instead of going to the blog. As another example, a change to a user's Outlook calendar residing on the user's desktop could be replicated to the virtual world, with an in-world calendar showing the change. These embodiments may reduce the amount of labor a user would have to perform to enact manual data transfer or other synchronization of information between a non-virtual world and virtual world space.

Figure 4:
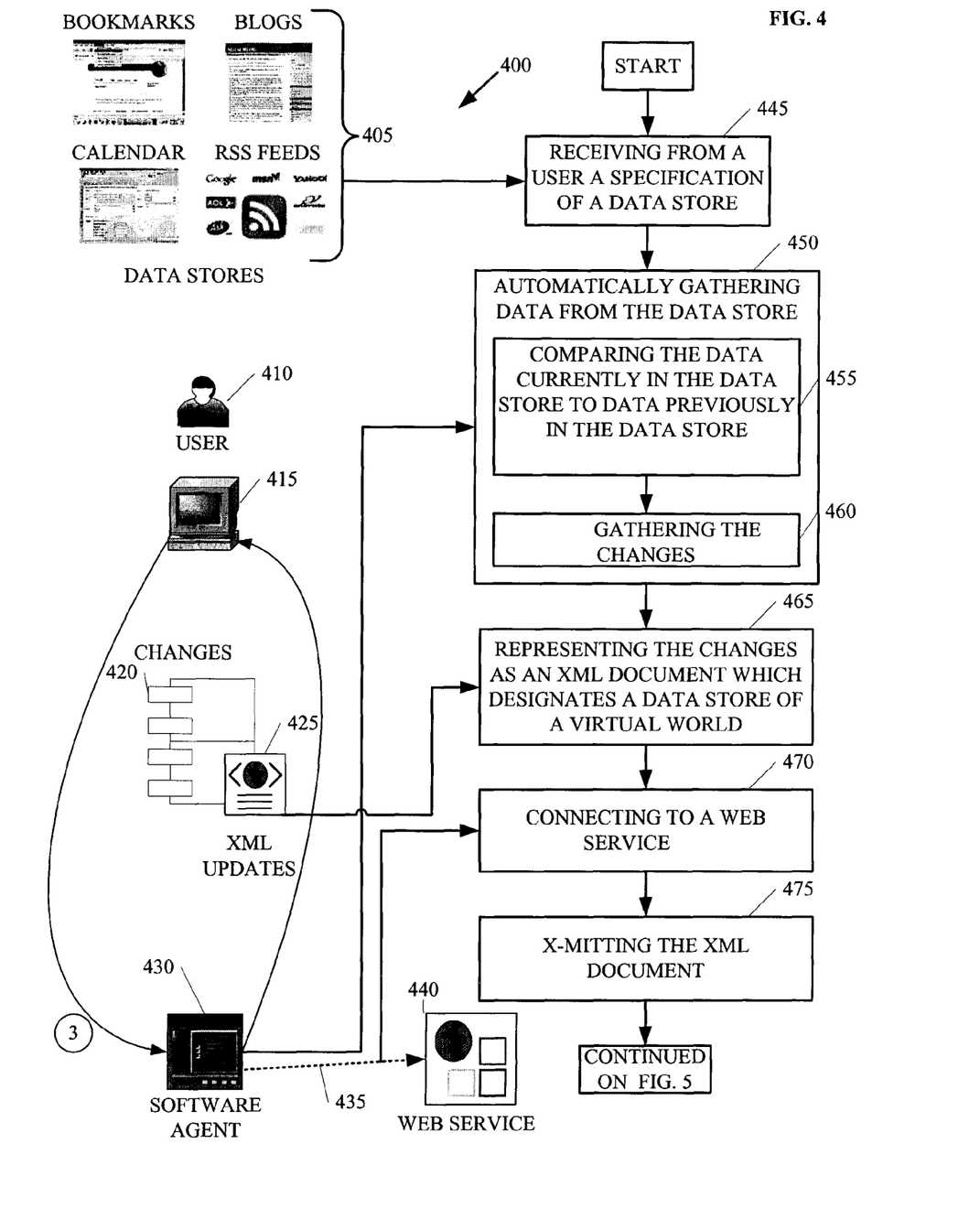
FIG. 4 depicts a flowchart of an embodiment of a portion of a method to automatically update a virtual world.
Figure 5:
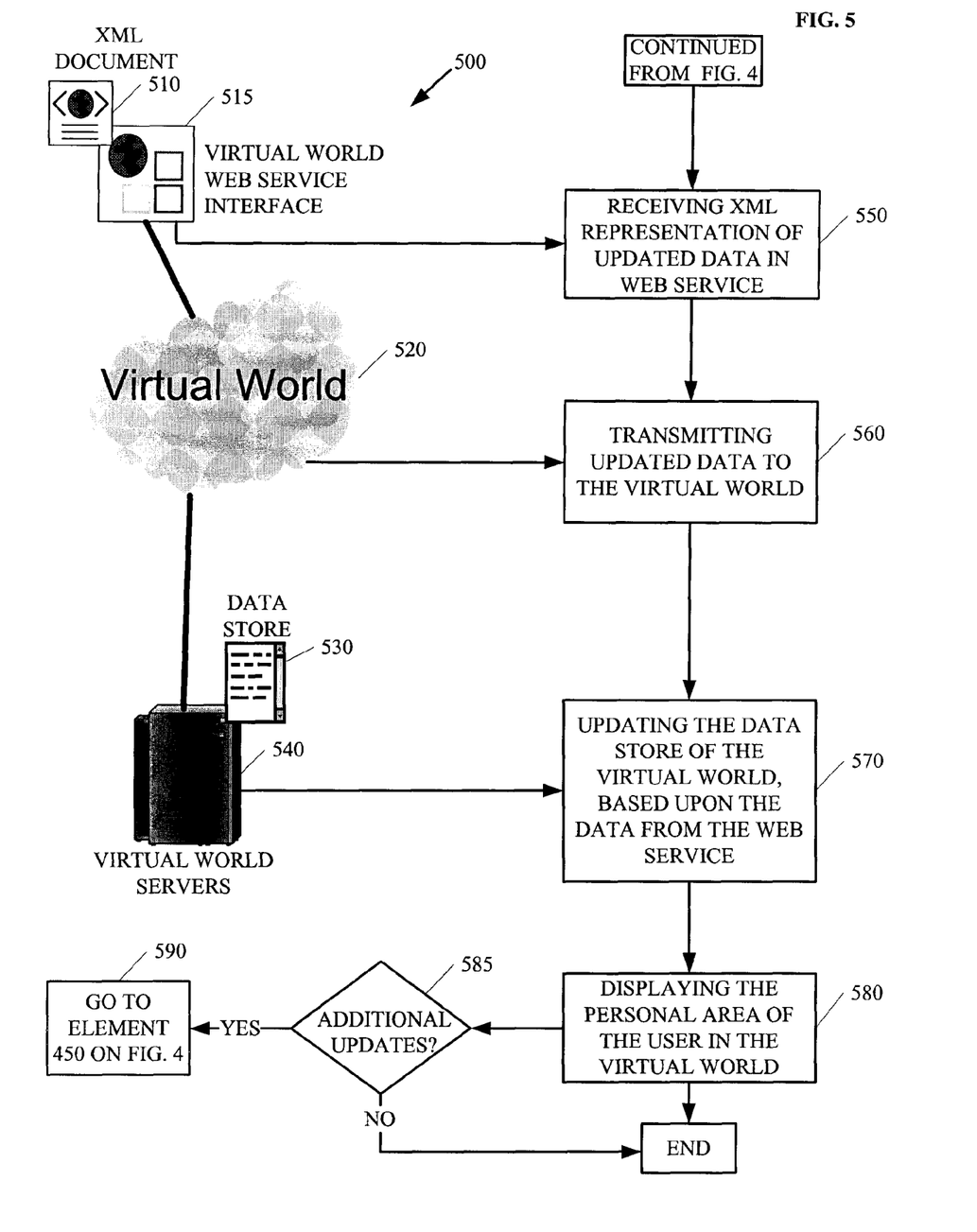
FIG. 5 depicts a flowchart of an embodiment of the remaining portion of a method to automatically update a virtual world.

FIGS. 4 and 5 depict flowcharts 400 and 500 of an embodiment of a method to automatically update a virtual world. Flowchart 400 depicts gathering the information for an update and transmitting a representation of the information. Flowchart 500 depicts a virtual world receiving the information and updating its data stores and displays. The right-hand-side of flowcharts 400 and 500 describe the methods in text. The left-hand-side of flowcharts 400 and 500 depict the methods pictorially, displaying the actors, objects and actions.

The method 400 of FIG. 4 may be performed by an apparatus such as updater 300 of FIG. 3A. Flowchart 400 of FIG. 4 begins with receiving from a user a specification of a non-virtual world data store (element 445) that contains data that may be displayed in a virtual world. The specification may consist of a reference to a data store, such as an address book or a list of favorites. In some embodiments, a user interface may enable a user such as user 410 to describe the data store, such as the format used or a description attached to some of the items of the data store to limit the data replicated in a virtual world. For example, addresses in an address book intended for transfer to a virtual world may be tagged with a character or phrase such as the letter "v" in a field of the address. Data stores 405 illustrates several types of data stores that may be specified, such as bookmarks, blogs, a calendar, or RSS feeds.

The method may include automatically gathering data from the specified data store (element 450). The gathering may be performed by a software agent such as software agent 430, which may search through a data store in a computing device such as desktop 415 for a data store belonging to a user such as user 410. In some embodiments, the gathering may include comparing the data currently in the data store to base line data about the data store (element 455). On initiation, a software agent such as software agent 430 may create a base line of the specified data store. On each update, the software agent may update the base line. The gathering may also include accumulating the changes from the base line to the current state of the data store (element 460). Changes 420 illustrates the accumulated list of changes to a data store since the last creation of a base line.

The method may include representing the changes as an XML document (XML updates document 425) which designates a data store of a virtual world (element 465). The XML document such as XML update document 425 may include a representation of the changes and a designation of a data store in a virtual world to be updated. The changes may include complete elements of a data store, such as a complete address, or may contain an identification of an element and a list of fields to be updated and the updated values. In some embodiments, the XML document may contain additional information, such as security information for gaining access to a user's personal area of a virtual world.

The method may include connecting 435 to a web service such as web service 440 (element 470) and transmitting the XML document (XML updates document 425) to web service 440 (element 475). In some embodiments, the web service may be hosted by the virtual world. In a few embodiments, the web service may allow access to a user's personal area based on a saved user name and password information stored on the location machine, such as desktop 315, in an encrypted file, and transmitted to the web service. The automatic updating of a virtual continues with FIG. 5.

The elements of FIG. 4 are for illustration and not for limitation. Other embodiments of automatically updating virtual worlds may omit steps or may contain additional steps as may be devised by those of skill in the art. For example, in some embodiments, the updating may not include comparing current data in the data store to a base line. Instead, the changes may be read immediately from the data store, or the complete contents of the data store may be sent to replace the current contents of the virtual world data store. In many documents, the representation of the data in the non-virtual world data store may be in a representation other than XML, such as straight text, or a proprietary representation. In a number of embodiments, the data about changes may be sent directly to a virtual world, rather than to an intermediary such as web service 340. In a few embodiments, a web service may have a host other than the virtual world.

Flowchart 500 depicts a virtual world receiving the information and updating its data stores and displays. Flowchart 500 is a continuation of flowchart 400 of FIG. 4. Flowchart 500 of FIG. 5 begins with a web service such as web service 515 receiving an XML representation of the updated data such as XML document 510 (element 550). The web service such as web service 515 may perform processing on the XML document such as XML document 510. The use of an intermediary such as web service 515 may enable the separation of the analysis of a non-virtual world data store and a virtual world data store. A software agent such as software agent 430 in FIG. 4 may produce a representation of the changes to a non-virtual world data store in terms of the fields of the non-virtual world data store. A web service such as web service 515 may then translate the fields of the non-virtual world data store to the fields of a virtual world data store.

The method of FIG. 5 includes transmitting the updated data to the virtual world (element 560). The updated data may be transmitted by a web service, such as virtual world web service interface 515, to a virtual world, such as virtual world 520. The method may include updating a data store, such as data store 530 of the virtual world, such as virtual world 520 (element 570), based upon the data from the web service. The updating may be carried out by virtual world servers, such as virtual world servers 540. In some embodiments, the server may make changes to the data store, such as data store 530, represented by the updated data, such as additions, deletions, and modifications to data in the data store represented by the updated data.

The method of FIG. 5 includes displaying data from the updated data store in the personal area of the user in the virtual world (element 580). A virtual world, such as virtual world 520, may display the data according to the virtual world's display mechanism. For example, the virtual world may display contact information as note cards posted on a wall, or books on a bookshelf, or files in a filing cabinet. The virtual world may determine the type of display of the updated data, and the order of the updated data in the data store.

If there are additional updates to the non-virtual world data store specified by the user (element 585), then elements 550 of FIG. 5 through 580 of FIG. 5 may be repeated. Otherwise, the method of flowchart 500 may end. The elements of flowchart 500 are for illustration and not for limitation. In alternative embodiments, additional elements may be included, some of the elements of flowchart 500 may be omitted, or the elements may be performed in a different order. In many embodiments, representations of updates may be transmitted by a data store in representations other than an XML representation. In other embodiments, representations of updates may be transmitted to the virtual world without the use of a web service as an intermediary processor. In a few embodiments, multiple web services may process the updates.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product for automatically updating a virtual world, the computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for automatically updating a virtual world. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of updating virtual worlds, the method comprising:
 receiving from a user a specification of a data store of the user, the data store external to a virtual world, wherein the data store comprises records and the receiving comprises receiving a specification of one or more of the following types of data stores:
  bookmarked web sites;
  recently visited sites;
  RSS feeds;
  blogs;
  social networking sites;
  integrated e-mail alerts;
  calendar entries;
  encrypted vaults for passwords;
  cookies;
  form-fill information;
  documents;
  spreadsheets;
  data bases;
  music files;
  videos;
  pictures; and
  other media files;
 automatically gathering data from the data store of the user, responsive to the receiving of the specification of the data store of the user;
 generating a representation of the data;
 transmitting the representation of the data to the virtual world;
 updating a data store of the virtual world, based upon the representation of the data; and
 displaying the data store of the virtual world in a personal area of the user in the virtual world, the displaying responsive to the updating, wherein:
  the data store of the user and the data store of the virtual world comprise data stores of the one or more types of data stores;
  the data store of the virtual world comprises an object of the virtual world; and the displaying the data store of the virtual world in the personal area of the user comprises displaying an icon representing the data store of the virtual world in the personal area of the user and keeping the data store of the virtual world private to the user.

2. The method of claim 1, wherein the receiving of the specification of the data store of the user, the gathering, the generating, and the transmitting comprise receiving, gathering, generating and transmitting by a software agent installed upon a local computer of the user.

3. The method of claim 1, wherein the transmitting comprises transmitting to an intermediary web service.

4. The method of claim 1, wherein the displaying the icon comprises displaying one of the following types of icons:
notes on a wall;
bookmarks;
address books;
books; and
calendars.

5. The method of claim 1, wherein the updating comprises replacing the contents of the data store of the virtual world with the complete contents of the data store of the user.

6. The method of claim 1, wherein:
the data store of the user comprises records; and
the gathering, generating, and transmitting comprise:
tagging the records, thereby designating records to be used to update the data store of the virtual world;
selecting records of the data store of the user from the records tagged for updating the data store of the virtual world;
generating a representation of a difference between the records tagged for updating currently in the data store of the user and the records tagged for updating previously in the data store of the user; and
transmitting the representation of the difference to the virtual world.

7. The method of claim 1, wherein:
the data store of the user comprises records, the records comprising fields; and
the gathering and generating comprise:
comparing the data currently in the data store of the user to data previously in the data store of the user;
determining values of fields comprising a difference between the data currently in the data store of the user and the data previously in the data store of the user; and
generating a representation comprising a specification of the fields and a specification of the values of the fields.

8. The method of claim 1, wherein the method comprises providing security checking before the displaying of the data store of the virtual world in the personal area of the user.

9. The method of claim 8, wherein the providing security checking comprises requiring a log in and password from the user to access the personal area of the virtual world.

10. The method of claim 1, wherein:
the method further comprises the user accessing the data store of the user from a non-virtual world application on a computing device; and
wherein the user accesses the personal area of the user in the virtual world from a virtual world application on the computing device.

11. A computer system to update virtual worlds, the computer system comprising:
a processor, a computer readable memory and a computer readable tangible storage device;
first program instructions to receive from a user a specification of a data store of the user, the data store external to a virtual world, wherein the first program instructions comprise program instructions to receive a specification of one or more of the following types of data stores:
bookmarked web sites;
recently visited sites;
RSS feeds;
blogs;
social networking sites;
integrated e-mail alerts;
calendar entries;
encrypted vaults for passwords;
cookies;
form-fill information;
documents;
spreadsheets;
data bases;
music files;
videos;
pictures; and
other media files;
second program instructions to automatically gather data from the data store of the user based upon the specification of the data store of the user;
third program instructions to generate a representation of the data;
fourth program instructions to transmit the representation of the data to the virtual world; and
fifth program instructions to update a data store of the virtual world based upon the representation of the data; and
sixth program instructions to display the data store of the virtual world in a personal area of the user in the virtual world in response to updating the data store of the virtual world based upon the representation of the data, wherein:
the data store of the user and the data store of the virtual world comprise data stores of the one or more types of data stores;
the data store of the virtual world comprises an object of the virtual world; and
the sixth program instructions comprise program instructions to display an icon representing the data store of the virtual world in the personal area of the user and program instructions to keep the data store of the virtual world private to the user, wherein the first, second, third, fourth, fifth, and sixth program instructions are stored on the computer readable tangible storage device for execution by the processor via the computer readable memory.

12. The computer system of claim 11, the computer system further comprising an intermediary web service to receive the representation of data, to process the data, and to transmit the processed data to the virtual world.

13. The computer system of claim 11, wherein:
the data store of the user comprises records;
the first program instructions comprise:
program instructions to tag the records, thereby designating records to be used to update the data store of the virtual world;
program instructions to select records of the data store of the user from the records tagged for updating the data store of the virtual world; and
program instructions to detect a difference between a current state of the data store of the user and a previous state of the data store of the user; and the second program instructions comprise program instructions to represent the difference between the records tagged for updating currently in the data store of the user and the records tagged for updating previously in the data store of the user.

14. The computer system of claim 11, wherein the first program instructions, second program instructions, third program instructions, and fourth program instructions comprise program instructions contained within a local computer of the user.

15. A computer program product to update virtual worlds, the computer program product comprising:
 a computer readable tangible storage device;
 first program instructions to receive from a user a specification of a data store of the user, the data store external to a virtual world, wherein the first program instructions comprise program instructions to receive a specification of one or more of the following types of data stores:
  bookmarked web sites;
  recently visited sites;
  RSS feeds;
  blogs
  social networking sites;
  integrated e-mail alerts;
  calendar entries;
  encrypted vaults for passwords;
  cookies;
  form-fill information;
  documents;
  spreadsheets;
  data bases;
  music files;
  videos;
  pictures; and
  other media files;
 second program instructions to automatically gather data from the data store of the user;
 third program instructions to generate a representation of the data;
 fourth program instructions to transmit the representation of the data to the virtual world;
 fifth program instructions to update a data store of the virtual world based upon the representation of the data; and
 sixth program instructions to display the data store of the virtual world in a personal area of the user in the virtual world in response to updating the data store of the virtual world based upon the representation of the data, wherein:
  the data store of the user and the data store of the virtual world comprise data stores of the one or more types of data stores;
  the data store of the virtual world comprises an object of the virtual world; and
  the sixth program instructions comprise program instructions to display an icon representing the data store of the virtual world in the personal area of the user and program instructions to keep the data store of the virtual world private to the user;
 the first, second, third, fourth, fifth, and sixth program instructions are stored on the computer readable tangible storage device; and
 the first program instructions, second program instructions, and third program instructions comprise program instructions to:
  tag the records, thereby designating records to be used to update the data store of the virtual world;
  select records of the data store of the user, the records tagged for updating the data store of the virtual world;
  generate a representation comprising a difference between the records tagged for updating currently in the data store of the user and the records tagged for updating previously in the data store of the user; and
  transmit the representation to the virtual world.

16. The computer program product of claim 15, wherein the first program instructions, second program instructions, third program instructions, and fourth program instructions comprise a software agent installed upon a local computer of the user.

17. The computer program product of claim 15, wherein;
 the data store of the user comprises records;
 the first program instructions, second program instructions, and third program instructions comprise program instructions to:
  tag the records, thereby designating records to be used to update the data store of the virtual world;
  select records of the data store of the user from the records tagged for updating the data store of the virtual world;
  generate a representation comprising a difference between the records tagged for updating currently in the data store of the user and the records tagged for updating previously in the data store of the user; and
  transmit the representation comprising the difference to the virtual world.

18. The computer program product of claim 15, wherein the fourth program instructions comprise program instructions to transmit to an intermediary web service.

19. The computer program product of claim 15, wherein the sixth program instructions comprise program instructions to display one of the following types of icons:
 notes on a wall;
 bookmarks;
 address books;
 books; and
 calendars.

20. The computer program product of claim 15, wherein the fifth program instructions comprise program instructions to replace the contents of the data store of the virtual world with the complete contents of the data store of the user.

* * * * *